(12) United States Patent
Martirosyan et al.

(10) Patent No.: US 11,108,878 B2
(45) Date of Patent: Aug. 31, 2021

(54) CHARACTERIZING DEVICE USAGE AT NETWORK OPERATORS

(71) Applicant: Intent.ai Inc., New York, NY (US)

(72) Inventors: Harutyun Martirosyan, Yerevan (AM); Seroj Alaverdian, Yerevan (AM); Zaven Navoyan, Yerevan (AM); Vahe Momjyan, New South Wales (AU)

(73) Assignee: Intent.ai Inc., New York, NY (US)

( * ) Notice: Subject to any disclaimer, the term of this patent is extended or adjusted under 35 U.S.C. 154(b) by 0 days.

(21) Appl. No.: 16/811,236

(22) Filed: Mar. 6, 2020

(65) Prior Publication Data

US 2020/0287980 A1    Sep. 10, 2020

Related U.S. Application Data

(60) Provisional application No. 62/815,902, filed on Mar. 8, 2019.

(51) Int. Cl.
    *H04L 12/26* (2006.01)
    *H04L 29/08* (2006.01)
    *H04L 29/06* (2006.01)

(52) U.S. Cl.
    CPC .......... *H04L 67/22* (2013.01); *H04L 43/065* (2013.01); *H04L 43/0876* (2013.01); *H04L 67/02* (2013.01); *H04L 67/12* (2013.01); *H04L 67/306* (2013.01); *H04L 63/1425* (2013.01)

(58) Field of Classification Search
    None
    See application file for complete search history.

(56) References Cited

U.S. PATENT DOCUMENTS

| | | | |
|---|---|---|---|
| 9,961,574 B1* | 5/2018 | Tubi | H04W 24/08 |
| 10,977,264 B2* | 4/2021 | Banti | G06Q 30/0241 |
| 2008/0059300 A1 | 3/2008 | Hamoui | |
| 2013/0019009 A1* | 1/2013 | Tremblay | G06Q 30/02 709/224 |
| 2014/0297407 A1 | 10/2014 | Sanghavi et al. | |

(Continued)

OTHER PUBLICATIONS

PCT International Search Report and Written Opinion, PCT Application No. PCT/US20/21403, dated May 28, 2020, 23 pages.

*Primary Examiner* — Joshua Joo
(74) *Attorney, Agent, or Firm* — Fenwick & West LLP

(57) ABSTRACT

An analytics provider receives a request for supplemental content to be displayed to a user by a user device. The request includes a network identifier identifying the user device on an access network over which the user device receives content. The analytics provider transmits the request for supplemental content and the network identifier to an analytics module provided by the analytics provider and executing at a network operator that manages the access network. The analytics module collects data describing behavior of the user device on the access network, determines at least one learned usage characteristic based on the data describing the behavior of the user device on the access network, selects a supplemental content item based on a target usage characteristic associated with the selected supplemental content item and the at least one learned usage characteristic, and provides the selected supplemental content item for display on the user device.

14 Claims, 5 Drawing Sheets

(56) References Cited

U.S. PATENT DOCUMENTS

| | | | |
|---|---|---|---|
| 2015/0142965 A1* | 5/2015 | Fukui | H04L 67/12 709/224 |
| 2015/0199710 A1* | 7/2015 | Bell | G06Q 30/0246 705/14.41 |
| 2015/0356581 A1 | 12/2015 | Litmanovich et al. | |
| 2018/0260840 A1* | 9/2018 | Jeon | G06Q 30/0201 |
| 2018/0300329 A1* | 10/2018 | Suleman | G06Q 50/01 |
| 2019/0335006 A1* | 10/2019 | George | G06N 3/084 |

* cited by examiner

CHARACTERIZING DEVICE USAGE AT NETWORK OPERATORS

CROSS-REFERENCE TO RELATED APPLICATION

This application claims the benefit of U.S. Provisional Application No. 62/815,902, filed Mar. 8, 2019, which is incorporated by reference in its entirety.

BACKGROUND

Field of Disclosure

The present invention generally relates to the learning usage characteristics of user devices, and more specifically to learning usage characteristics of a user device based on network activity of the user device using an analytics module located at a network operator.

Description of the Related Art

Various computer service providers (e.g., website or app providers) learn information about users based on behaviors of the users on their computers, phones, and other devices. For example, current apps and websites track the behavior of their users on the apps and websites, and can learn characteristics of the users based on their behavior. However, the observed portion of a user's behavior is limited to the user's behavior within the environment of the particular app or website. In addition, this process for learning user characteristics exposes users to violations of privacy. Data describing the user's behavior is typically transmitted over a network to the service provider's server, which analyzes the underlying behavior to characterize the users or user devices. This involves transmitting a user's personal data over a network and storing the personal data and learned user characteristics at the service provider. Transmitting and users' data over a network and storing the data at the server provider's system may lead to unintended losses of privacy, e.g., if communications are intercepted or the service provider's security is breached. In addition, service providers or third parties who can access the stored data may use the learned user characteristics in ways that many users do not approve of.

SUMMARY

The above and other issues are addressed by a method, computer-readable medium, and analytics provider for providing supplemental content to the user. An analytics provider coordinates with one or more network operators to learn usage characteristics of user devices and provide supplemental content to the user devices based on the learned usage characteristics. A network operator manages a network (e.g., a mobile network or a broadband network) over which user devices transmit and receive data. The analytics provider provides an analytics module to the network operator, and the analytics module learns usage characteristics of user devices based on communications of the user devices over the network managed by the network operator. Various content providers provide supplemental content and target usage characteristics for the supplemental to the analytics provider, and the analytics provider provides said supplemental content and corresponding target usage characteristics to the analytics module at the network operator. The analytics module selects a supplemental content item for delivery to a particular user device based on the target usage characteristics for the supplemental content item and the learned usage characteristics of the user device. Because the analytics module resides at the network operator and learns characteristics based on network traffic, user behavior data is not transferred between parties or stored outside the network operator's system. In addition, the usage characteristics determined by the analytics module are associated with a particular device based on device activity, rather than being directly associated with a user, which further preserves users' privacy.

In an embodiment, an analytics provider receives a request for supplemental content to be displayed to a user by a user device. The request includes a network identifier identifying the user device on an access network over which the user device receives content. The analytics provider transmits the request for supplemental content and the network identifier of the user device to an analytics module provided by the analytics provider and executing at a network operator. The network operator manages the access network. The analytics module collects data describing behavior of the user device on the access network managed by the network operator. The data is associated with the network identifier of the user device. The analytics module determines at least one learned usage characteristic of the user device based on the data describing the behavior of the user device on the access network, and selects a supplemental content item from a plurality of supplemental content items based on a target usage characteristic associated with the selected supplemental content item and the at least one learned usage characteristic of the user device. The analytics module provides the selected supplemental content item for display on the user device.

DETAILED DESCRIPTION

Figure 1:
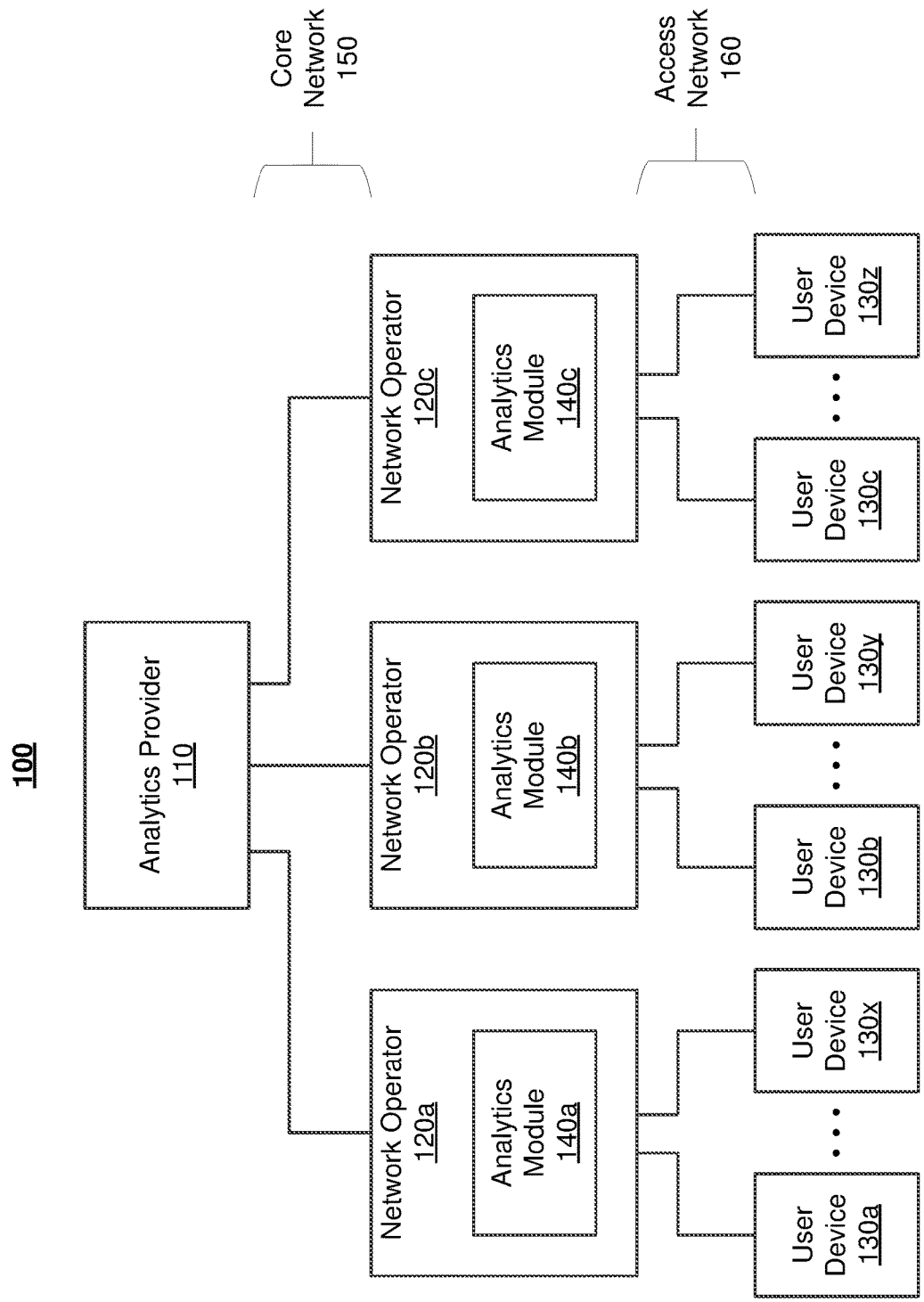
FIG. 1 is a high-level block diagram illustrating an embodiment of an environment for learning usage characteristics of user devices based on network activity.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

It is noted that wherever practicable similar or like reference numbers may be used in the figures and may indicate similar or like functionality. A letter after a reference numeral, such as "140*a*," indicates that the text refers specifically to the element having that particular reference numeral. A reference numeral in the text without a following letter, such as "140," refers to any or all of the elements in the figures bearing that reference numeral. For example, "140" in the text refers to reference numerals "140a" and/or "140b" and/or "140c" in the figures.

FIG. 1 is a high-level block diagram illustrating an embodiment of an environment 100 for learning usage characteristics of user devices based on network activity. The environment 100 includes an analytics provider 110 connected to three network operators 120a-120c. Each network operator 120 operates a network to which a set of user devices is connected; for example, network operator 120a is connected to user devices 130a through 130x over the network managed by network operator 120a. There may be thousands or millions of client devices 130 in communication with each network operator 120. Here, three network operators 120 are illustrated, but there may be additional or fewer network operators connected to the analytics provider 110, each operating a different network to which a set of user devices 130 are connected.

The user devices 130 are computing devices such as smartphones with an operating system such as ANDROID® or APPLE® IOS®, tablet computers, laptop computers, desktop computers, or any other type of network-enabled device on which content can be provided to users. Typical user devices 130 include the hardware and software needed to receive input from users (e.g., via a mouse, keyboard, and/or touchscreen), output text, images, videos, and other content to users, output sound, and connect to a network (e.g., via Wi-Fi, 4G, or other wired or wireless telecommunication standards). Each user device 130 include software that allow the user device 130 to request and receive content from content providers. For example, a user device 130 can include one or more web browsers and one or more applications or "apps" that the user device 130 can use to browse, select, and view content from one or more content providers.

Each network operator 120 provides a communication infrastructure through which the user devices 130 can access an access network 160 provided or managed by the network operator 120. Each network operator 120 may include a set of interconnected physical devices of various types (e.g., routers, servers, cell towers, etc.) that are used to operate the access network 160. For example, the network operator 120 can provide access to a mobile wired or wireless network, a Local Area Network (LAN), a Metropolitan Area Network (MAN), a Wide Area Network (WAN), a private network, or a virtual private network. In some embodiments, multiple user devices 130 can be directly connected to each other over the access network 160 managed by the network operator 120. The network operator 120 also provides access to an external network, typically the Internet, through the access network 160. The access to the external network allows the user devices 130 to communicate with other devices and systems that are outside the network managed by the network operator 120, such as the analytics provider 110 and various content publishers or providers.

As an example, network operator 120a is a cellular network operator (e.g., VERIZON® or AT&T®) that provides a mobile access network to which mobile user devices (e.g., smartphones) can connect. Mobile user devices connect to equipment provided or managed by the cellular network operator (e.g., cell towers), which are also connected to the Internet. Thus, the network operator 120a acts as an intermediary between the mobile user devices and other devices on the Internet and passes data traffic between the mobile user devices and various third parties, such as website and app providers. As another example, network operator 120b is a broadband network operator (e.g., COMCAST® or TIME WARNER®) that provides a broadband access network through which wired or wireless user devices (e.g., computers, tablets, or smartphones) can connect to the Internet. In some embodiments, a single user device 130 can connect to multiple access networks 160 at the same time or at different times. For example, a smartphone can connect to the broadband network operator 120b when the smartphone is located within a building with Wi-Fi, and the same smartphone can connect to the mobile network operator 120a when the smartphone is located outside the range of a Wi-Fi connection. As another example, a smartphone can connect to the access network provided by a broadband network operator 120b for data applications (e.g., web browsing), and connect to the access network provided by a mobile network operator 120a to place cellular calls.

The analytics provider 110 provides tools for analyzing network traffic to learn characteristics of the user devices 130. The analytics provider 110 connects to the network operators 120 through a core network 150, which may be the same network or a different network from the access network 160. The analytics provider 110 transmits an analytics module 140 to each network operator 120 over the core network 150, and the analytics module 140 is stored and executed locally by each of the network operators 120. The analytics module 140 can be distributed and/or replicated throughout a network operator's physical equipment, e.g., the analytics module 140 can be executed by multiple servers controlled by the network operator 120. The analytics module 140 analyzes the behavior of the user devices 130 on the network operated by the network operator 120 to determine usage characteristics of each device. For example, the analytics module 140 can analyze the network traffic, such as DNS logs, network flow logs, cell logs, or other type of logs to determine usage characteristics.

Usage characteristics include any characteristics that describe or can be derived from the behavior of a user device on the network. For example, usage characteristics can include websites accessed by the user device 130, apps accessed by the user device 130, frequency of access to different websites and/or apps, times of network activities, duration of network activities, device location, etc. In some embodiments, usage characteristics also include information that the analytics module 140 infers about a user of the user device 130 from the behavior of the user device 130, e.g., age, gender, location, marital status, hobbies, occupation, interests, or other types of information. In some embodiments, the analytics module 140 first identifies one or more apps accessed by the user device 130, and then infers information about a user of the user device 130 based on the identified app(s). The analytics module receives supplemental content from various supplemental content providers (not shown in FIG. 1) along with target usage characteristics corresponding to each supplemental content item. The analytics module 140 can select supplemental content items to provide to user devices 130 based on the learned usage characteristics and the target usage characteristics. In some embodiments, the network operators 120 can also use the usage characteristics for their own purposes, e.g., to target content or improve network service.

The analytics provider 110 can provide the analytics module 140 to many network operators 120, each of which provides network access to many user devices 130. Thus, the analytics modules 140 provided by the analytics provider 110 can learn usage characteristics of a great number of user devices. Unlike prior methods for learning about users, the analytics provider 110 can learn usage characteristics for all user devices 130 that access any of the access networks 160 managed by the network operators 120, rather than, for example, devices or users that connect to a particular content publisher. This allows the analytics provider 110 to learn usage characteristics for a broad set of user devices 130 and over a broader set of usages of the user devices 130. It also allows the analytics provider 110 to optimize the analytics module 140 for the broad set of network operators 120 and user devices 130.

Figure 2:
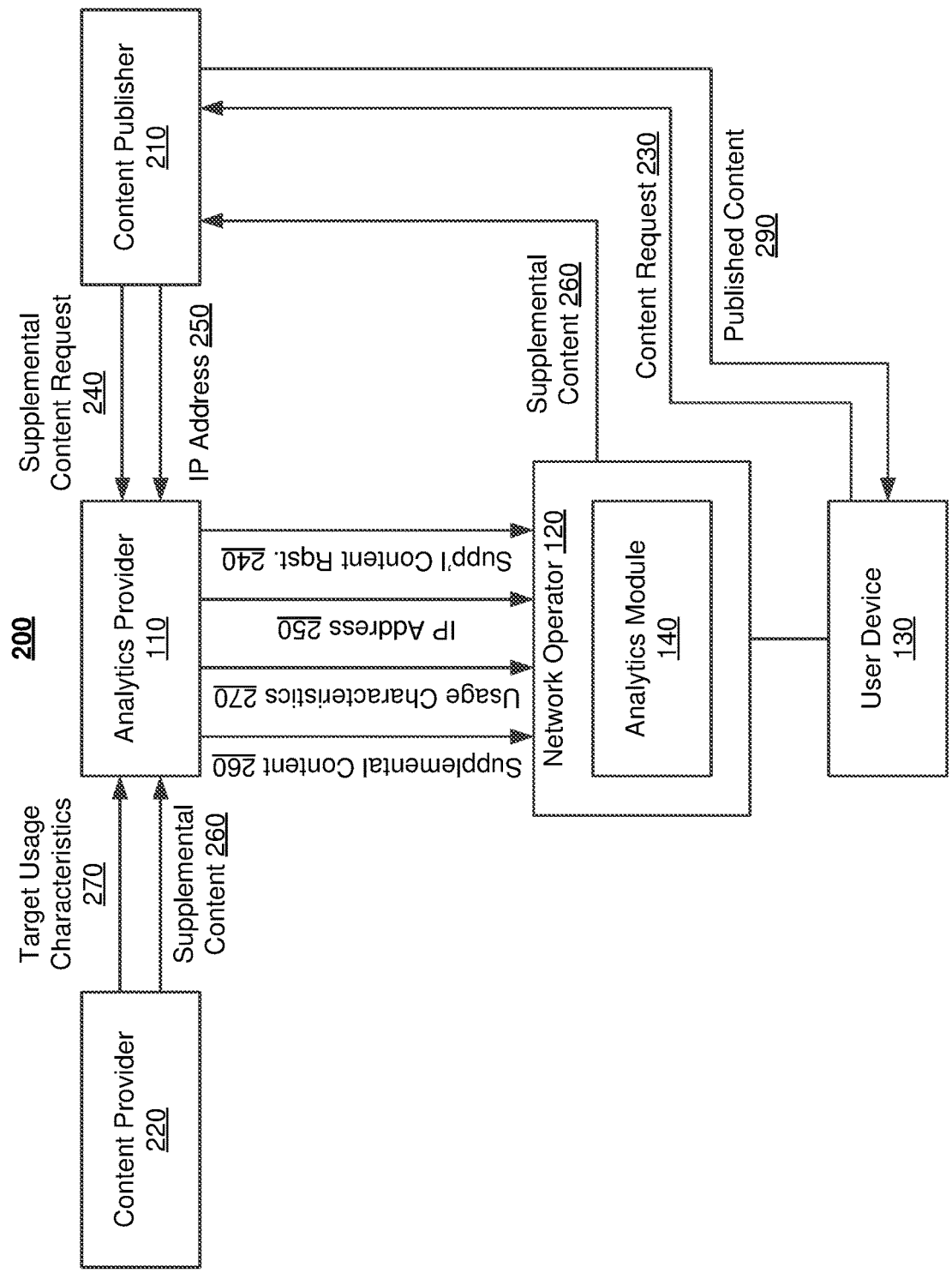
FIG. 2 is a diagram showing data flows for providing content to a user device based on a content request, according to one embodiment.

FIG. 2 is a diagram 200 showing data flows for providing content to a user device based on a content request, according to one embodiment. The diagram 200 shows the relationship between the analytics provider 110, one of the network operators 120, and one of the user devices 130 of FIG. 1, as well as one content publisher 210 and one content provider 220. As described with respect to FIG. 1, there may be more network operators 120 connected to the analytics provider 110, and many user devices 130 connected to the network operator 120, but a single user device 130 and single network operator 120 are shown in this example. There may also be many content publishers 210 and content providers 220, but one of each are shown in this illustration.

The content publisher 210 provides content to the user device 130. The content publisher 210 publishes primary content provided by the content publisher 210, such as written content, image content, video content, or some combination of content. The primary content may be generated by the content publisher 210 or on behalf of the content publisher 210. The content publisher 210 also receives and publishes supplemental content from one or more internal or external sources, including one or more content providers 220, and provides a combination of the primary content and supplemental content, or some subset of the combined content, to the user device 130 as published content. For example, the content publisher 210 can provide a web page that includes some combination of text, images, video, links, advertisements, and/or other elements. As another example, the content publisher 210 can provide content elements that are displayed in an app provided by the content publisher 210. The app can include instructions for displaying content received from the content publisher 210 and/or one or more content providers 220.

The content provider 220 provides supplemental content that is published by the content publisher 210 to the user device 130. The analytics provider 110 receives requests from multiple content providers to provide supplemental content to users that match target usage characteristics associated with various content items. For example, the content provider 220 provides supplemental content that relates to New York Metropolitan Opera tickets, and target usage characteristics describing people in the New York metro area with an interest in classical music or opera music. Another content provider provides supplemental content that relates to woolen socks, and target usage characteristics describing people in cool climates with an interest in hiking. The supplemental content provided by the content provider 220 is matched with the user device 130 at the analytics module 140 of the network operator 120 and then provided by the content publisher 210 to the user device 130, as described in detail below.

The diagram 200 shows the flow of data between the analytics provider 110, network operator 120, a user device 130, a content publisher 210, and a content provider 220. The analytics provider 110 manages the flow of requests and data between the content provider 220, the content publisher 210, and the analytics module 140. The user device 130 transmits a content request 230 to the content publisher 210. If the user device 130 is connected to the access network 160 managed by the network operator 120, the content request 230 is transmitted to the content publisher 210 by the network operator 120. The analytics module 140 uses network traffic such as the content request 230 and the content provided in response to the content request (along with additional network traffic between the user device 130 and the content publisher 210, and network traffic between the user device 130 and other content publishers or other types of devices or systems) to learn usage characteristics of the user device 130.

The content publisher 210 receives the content request 230 and transmits a supplemental content request 240 requesting supplemental content from a content provider, such as content provider 220, along with a network identifier of the user device 130, such as the IP address 250 of the user device, to the analytics provider 110. The analytics provider 110 forwards the supplemental content request 240 to the analytics module 140 at the network operator 120, along with the received IP address 250. The analytics module 140 can use the IP address 250 to identify the user device 130 associated for which the supplemental content request 240 is received. If the analytics provider 110 is connected to multiple network operators 120 as shown in FIG. 1, the analytics provider 110 can first identify the network operator 120 managing the network accessed by the user device 130, e.g., based on the IP address 250. For example, the analytics provider 110 may store a set of rules for identifying which IP addresses are associated with which network operators 120, and select the network operator 120 based on the IP address received from the content publisher 120. Alternatively, the analytics provider 110 may receive an identifier of the network operator 120 from the content publisher 210 along with the request and the IP address. In other embodiments, the analytics provider 110 transmits the request for usage characteristics to multiple or all network operators 120 executing an analytics module 140, and each analytics module 140 determines if it can determine usage characteristics for the IP address and select supplemental content.

The content provider 220 transmits supplemental content 260 and target usage characteristics 270 corresponding to the supplemental content 260 to the analytics provider 110. The analytics provider 110 forwards the supplemental content 260 and target usage characteristics 270 received from the content provider 220 to the analytics module 140 at the network operator 120. If the analytics provider 110 has provided multiple analytics modules to multiple network operators, the analytics provider 110 may provide the supplemental content 260 and target usage characteristics 270 to all of the analytics modules, or some subset of the analytics modules, e.g., analytics modules for network operators operating in a particular country or sets of countries, or analytics modules at a certain type of network operators, e.g., mobile networks, or Internet providers.

The analytics module 140 determines one or more usage characteristics of the user device 130 based on stored data describing the behavior of the user device 130 associated with the IP address 250 on the network. The analytics module 140 determines to provide the supplemental content 260 to the user device 130 based on the target usage characteristics 270 and the determined usage characteristics of the user device 130, which the analytics module retrieved based on the IP address 250. The analytics module 140 may choose the supplemental content 260 among a library of supplemental content, each having corresponding target usage characteristics, received from various content providers. The analytics module 140 transmits the supplemental content 260 to the content publisher 210. The content publisher 210 combines the supplemental content 260 with primary content requested in the content request 230 and publishes the combined supplemental content 260 and primary content as the published content 290, which the content publisher 210 transmits to the user device 130. The published content 290 may be transferred to the user device 130 through the access network 160 managed by the network operator 120; if so, the analytics module 140 collects data describing the network traffic for transmitting the published content 290 to the user device 130.

In some embodiments, the flow of data can be altered from the flows shown in FIG. 2. For example, the content publisher 210 may provide a content request to the content provider 220, which then provides the IP address 250 to the analytics provider 110 with the target usage characteristics 270. As another example, the content provider 220 may provide the supplemental content 260 directly to the content publisher 210 in response to an indication from the analytics module 140 that a supplemental content request 240 has been matched to the target usage characteristics 270, rather than passing the supplemental content 260 through the analytics provider 110.

In some embodiments, the supplemental content 270 itself is not transmitted through the content publisher 210. Instead, the content provider 220, or the analytics module 140, may provide a link to a particular supplemental content item to the content publisher 210. This link is included in the published content 290, and the user device 130, responsive to receiving the link in the published content 290, retrieves the content item indicated by the link directly from the content provider 220 via the network operator 120, and then the user device 130 displays the linked content to a user.

By placing the analytics module 140 within the network operator 120, the correlation between the IP address 250 and the learned usage characteristics of the user device 130 is only available inside the analytics module 140. The content provider 220 provides the target usage characteristics 270, but does not receive the IP address 250, or the learned usage characteristics determined by the analytics module 140. The content publisher 210 receives the IP address 250, but does not receive the target usage characteristics 270, or the learned usage characteristics determined by the analytics module 140. As long as the security of the network operator 120 is maintained, the association between IP addresses and usage characteristics learned by the analytics module 140 is not exposed.

In addition, using a network ID, such as an IP address 250, to identify each user device at the content publisher 210 and analytics provider 110 (e.g., as opposed to using a unique, static identifier to identify each individual user) helps preserve users' privacy. A single user can be associated with many IP addresses, which often change over time. For example, when a user device moves to a different network access point, or a user uses a different device, a new IP address is assigned to that device—and that IP address can later be reassigned to a different device of a different user. The network operator 120 maintains data indicating which IP address 250 corresponds to each user at any given time, but this data does not leave the network operator 140 in the data flow shown in FIG. 2.

Figure 3:
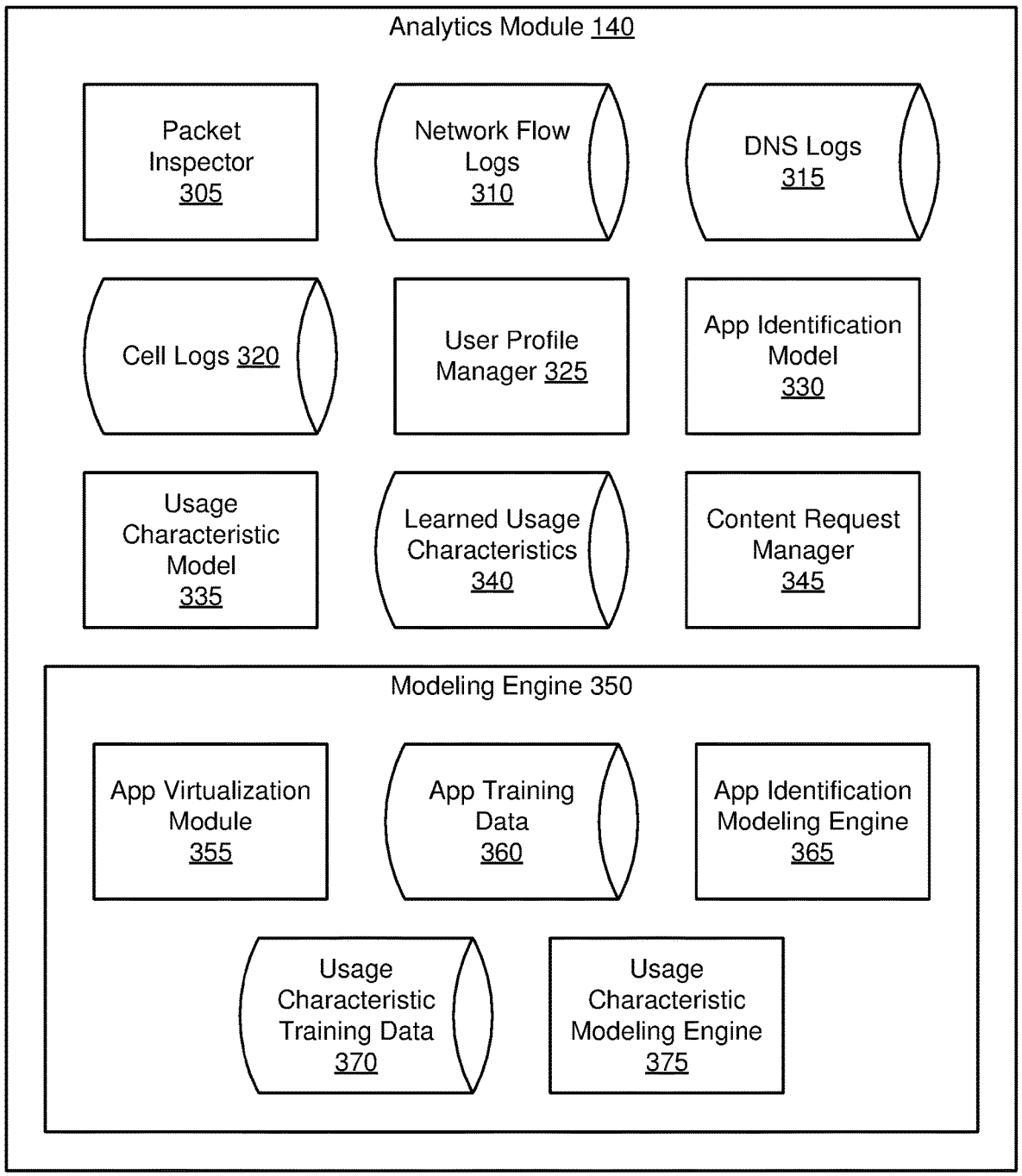
FIG. 3 is a block diagram illustrating a detailed view of an analytics module, according to one embodiment.

FIG. 3 is a block diagram illustrating a detailed view of the analytics module 140, according to one embodiment. The analytics module 140 includes a packet inspector 305; various usage logs, including network flow logs 310, DNS logs 315, and cell logs 320; a user profile manager 325; an app identification model 330; a usage characteristic model 335; learned usage characteristics 340; a content request manager 345; and a modeling engine 350. The modeling engine includes an app virtualization module 355, app training data 360, an app identification modeling engine 365, usage characteristic training data 370, and a usage characteristic modeling engine 3750. In other embodiments, the analytics module 140 includes fewer, additional, or alternative components.

The packet inspector 305 inspects the network activity of user devices 130 over the network managed by the network operator 120. The packet inspector 305 collects data describing packets that are sent to the user device 130 from other devices (e.g., the content publisher 210 or the content provider 220) and/or packets that are sent to the user device 130. The packet inspector 305 may perform lightweight packet inspection, stateful packet inspection, deep packet inspection, or another type or level of inspection. The packet inspector 305 contains instructions that describe which data describing the network activity to collect and store as network traffic data.

In some embodiments, the user device 130 and/or servers with which the user device 130 is communicating (e.g., the content publisher 210 or the content provider 220) encrypt data transmitted from or to the user device 130. This may limit the data that is visible to the packet inspector 305. Accordingly, the packet inspector 305 may store data describing the transmission patterns to and from the user devices 130, but not store data describing the contents of the packets themselves.

For example, if the packet inspector 305 is inspecting internet protocol (IP) data, the packet inspector 305 may inspect the IP header, the transmission control protocol (TCP) header, user datagram protocol (UDP) header, and one or more other headers, to the extent that these field are unencrypted. In some embodiments, the packet inspector 305 may also inspect the data payload if it is unencrypted. The packet inspector 305 may extract data directly from the headers and/or payloads, such as source IP address and port, destination IP address and port, website being accessed, size of packet, etc. The packet inspector 305 may also generate metadata describing a packet or series of packets, such as type of content, subject matter of content, time at which the network operator 120 received a packet, number of packets transmitted from a source to a destination, frequency of packet transmission from a source to a destination, etc. In some embodiments, the packet inspector 305 collects data that can be used to identify an app being used by the user device 130, even if the packets themselves are encrypted.

Information collected by the analytics module 140, such as by the packet inspector 305, or by other components of the network operator 120 are stored in various usage logs. The usage logs include network traffic logs 310, DNS logs 315, and cell logs 320. These usage logs store information describing the behavior of the user device 130 on the access network 160. For example, the usage logs store information about requests made by user devices, data transferred to user device, locations of user devices, calls made by user devices, etc.

The packet inspector 305 stores collected network traffic data describing network traffic to and from user devices 130 in the network flow logs 310. The network flow logs 310 describe patterns of network traffic to and from user devices 130 that pass through the network interfaces of the network operator 120. For example, the network flow logs 310 include network traffic data that describes summary statistics of packet size, packet frequency, numbers of transmissions, directions of transmissions, or other characteristics of the network traffic to and from user devices 130 as determined by the packet inspector 305. The network flow logs 310 may further include packet-level data, such as source IP address, destination IP address, source and destination ports, IP protocol version, type of service, start time, and duration of each transmission. Other information collected or generated by the packet inspector 305, such as a description of the content, can also be stored in the network flow logs 310, or it may be stored in a separate log.

Each network flow log is associated with a particular user device 130 using a network identifier of the user device 130. As described above, an IP address can be used to identify a user device 130; the IP address of the user device 130 can be obtained from the IP header. In some embodiments, a port is also used to identify a particular user device 130, e.g., if multiple user devices are assigned the same IP address. Other types of network identifiers, such IMSI (International Mobile Subscriber Identity), other types of subscriber identity, or a telephone number, can be used instead of or in addition to the IP address.

In some embodiments, the network operator 120 has its own packet inspector 305 and transmits data collected by the packet inspector 305 to the analytics module 140. For example, the network operator 120 may use a deep packet inspector for routing packets received from and transmitted to user devices 130; the deep packet inspector may collect the data used for routing and provide it to the analytics module 140 for storage in the network flow logs 310.

In some embodiments, additional logs are stored by the analytics module 140 in other usage logs based on information collected by the analytics module 140 or another component of the network operator 120. As an example, the network operator 120 provides domain name system (DNS) translation, which involves translating a domain name into a destination IP address based on a correlation between domain name and IP address stored at the network operator 120. In this example, the network operator 120 may provide data describing domain names and times in which they were accessed by a user device 130 to the analytics module 140, which stores the DNS requests and associated network identifiers in a DNS log 315.

As another example, if the network operator 120 is a cellular network operator, the analytics module 140 may include cell logs 320 describing non-IP traffic that is passed through the network operator 120, and locations of the user device 130. For example, the cell logs 320 can include data describing calls made (e.g., source phone number, destination phone number, time, duration), data describing text messages sent or received (e.g., source phone number, destination phone number, time), information about base stations accessed, etc. The cell logs 320 can also include device location logs describing the location of the user device 130 at different times. In some embodiments, the usage logs may comprise a separate location log that stores information describing reported locations of user devices 130.

The analytics module 140 includes a user profile manager 325 that collects different types of device and user network identifiers coming from network devices, such as AAA server logs, SIM card IDs, etc. The device and user network identifiers may include. but are not limited to, the IMSI (International Mobile Subscriber Identity) or other types of subscriber identity, such a telephone number, which can be used instead of or in addition to the IP address. Based on the device or user network identifiers, the user profile manager creates a hashed non-reversible unique identifier by encrypting and hashing network identifiers. The network identifiers may be associated with a particular user device 130 or a particular user. The user profile manager connects a current IP address of a user device or a user with the unique hashed identifier. In particular, the user profile manager 325 associates unique hashed identifiers with specific IP addresses assigned to user devices 130 in real time, and intermittently updates the IP address associated with a unique hashed identifier. For example, if a user device 130 moves from one network access point to a different network access point on the same network (e.g., from one cell tower to another cell tower), the network operator 120 can dynamically assign the user device 130 a new IP address, and update the IP address associated with the unique hashed identifier for the user device 130. As another example, if a user device 130 leaves a network and later rejoins the network (e.g., if a user device 130 leaves a home network in the morning and rejoins the home network in the evening), the network operator 120 may assign the user device 130 a new IP address, and update the IP address associated with the unique hashed identifier for the user device 130.

The user profile manager 325 keeps track of the current IP address for each user device 130 on the network, and in some embodiments, may also keep track of one or more previous IP addresses for user devices 130. The user profile manager 325 may determine when an IP address is no longer associated with a user device, and has been re-assigned to a different user device. When the IP address is re-assigned, the user profile manager 325 associates network data generated by the reassigned IP address with the corresponding unique hashed identifier.

The analytics module 140 also includes one or more models for determining usage characteristics for a user device 130 or user based on the network traffic data. The app identification model 330 is a rule-based and/or machine-learned model that can identify apps that are running on the user device 130 based on network traffic data. A particular app running on a user device 130, such as a smartphone, may have a particular pattern of network traffic data, e.g., based on packet size, packet frequency, numbers of transmissions, directions of transmissions, or other characteristics of the network traffic. The app identification model 330 is configured to identify an app that is executing based on network flow logs 310 and/or DNS logs 315 of a user device 130, which describe the network traffic to and from the user device 130. The app identification model 330 is trained by the app identification modeling engine 365 within the modeling engine 350.

The usage characteristic model 335 determines one or more usage characteristics based on the apps identified by the app identification model 330 and/or other network traffic data, e.g., data stored in the network flow logs 310, DNS logs 315, and/or cell logs 320, including device location logs. The usage characteristic model 335 may be in the form of a machine-learned model, a set of rules, one or more statistical processes, or another type of process for determining or summarizing usage characteristics based on the behavior of the user device on the network. The usage characteristics model 335 stores the usage characteristics determined for a user device 130 (or user) in the learned usage characteristics database 340. The learned usage characteristics database 340 associates usage characteristics with the unique hashed identifier for the user or user device to which the usage characteristics apply.

In one embodiment, the usage characteristic model 335 is a set of rules provided by the analytics provider 110 for assigning usage characteristics based on particular patterns. In one embodiment, the usage characteristic model 335 is a set of rules that associate on one or more apps identified by the app identification model 330 to one or more characteristics describing the user of the user device 130. For example, the usage characteristic model 335 may have a rule indicating that a particular set of social networking apps are typically used by users aged 18-25. If the usage characteristic model 335 receives input from the app identification model 330 that the user device 130 is currently accessing one of this set of social networking apps, the usage characteristic model 335 outputs a usage characteristic of a 18-25 year old. In other examples, the analytics provider 110 can provide rules for the usage characteristic model 335 indicating that particular apps or sets of apps are associated with other age ranges, locations (e.g., apps for assisting with mass transit in a city or region are associated with that city or region), marital status (e.g., dating apps may be associated with single people), personal interests, etc.

In some embodiments, the usage characteristic model 335 may perform an analysis of the outputs from the app identification model 330, e.g., to determine one or more apps most frequently used by the user device 130, or to determine other usage patterns of the apps. The usage characteristic model 335 may determine the usage characteristic(s) based on characteristics associated with apps that the user device 130 has accessed the most frequently, has accessed for at least a threshold duration of time, has accessed at least a threshold number of times, etc.

In addition or alternatively, the usage characteristic model 335 may perform other analysis of collected network traffic data and determine, for example, one or more most frequently visited websites (e.g., based on the DNS logs 315), periods of time with most cell phone use, or the location history of the user device 130. The usage characteristic model 335 may associate the results of these other analyses to one or more characteristics describing the user of the user device 130. For example, rules included in the usage characteristic model 335 and provided by the analytics provider 110 may associate particular websites or sets of websites with particular age ranges, interests, locations, etc.

In another embodiment, the usage characteristic model 335 includes a machine learned model that identifies one or more usage characteristics based on the apps identified by the app identification model 330 and/or the collected network traffic data. The machine learned model correlates trends in the app usage or other collected network traffic data to usage characteristics. The usage characteristic model 335 may first perform analyses summarizing the app usage and/or network traffic data, and then input the results of this analysis to the machine learned model. As an example, the usage characteristic model 335 may generate summary of DNS data associated with the user device 130 in the DNS logs 315 (e.g., percentage of browsing time spent at each of the top 100 or top 1000 most popular domains) and then use the machine-learned model to determine, based on the summary data, one or more usage characteristics (e.g., one or more interests reflected by the domains visited by the user device 130).

If the user profile manager 325 indicates that a user device 130 is associated with multiple network identifiers, the analytics module 140 may combine multiple stored network flow logs, DNS logs 315, and/or cell logs 320 of the user device 130 and input the combined log data into the app identification model 330 and/or the usage characteristic model 335. Alternatively, the app identification model 330 and/or the usage characteristic model may operate on each log separately, and the analytics module 140 may combine the learned usage characteristics and store them in the learned usage characteristics database 340.

The user profile manager 325 may periodically update or refresh the learned usage characteristics 340 for a user or user device. For example, when the analytics module 140 receives additional data describing the behavior of the user on the network, the usage characteristic model 335 may determine one or more usage characteristics based on the newly received data. As another example, the analytics module 140 may determine usage characteristics for each user at a regular interval, e.g., hourly or daily. The learned usage characteristics database 340 may store the most recently determined usage characteristics for each user, usage characteristics learned over a given period of time (e.g., the past week, or the past month), or use some other criteria for ensuring that the stored learned usage characteristics reflect current usage characteristics of a user.

The content request manager 345 manages requests to provide supplemental content from content providers, and requests for supplemental content from content publishers. The content request manager 345 receives the supplemental content request 240 and IP address 250 associated with the supplemental content request 240. The content request manager 345 also receives and stores the supplemental content and target usage characteristics from various content providers, such as the supplemental content 260 and target usage characteristics 270 from the content provider 220 shown in FIG. 2. The analytics module 140 may include a database (not shown in FIG. 3) for storing supplemental content and corresponding target usage characteristics.

When the content request manager 345 receives a request for supplemental content including an IP address from a content publisher, e.g., content publisher 210, the content request manager 345 requests the unique hashed identifier associated with the IP address from the user profile manager 325. The user profile manager 325 returns the unique hashed identifier currently associated with the IP address to the content request manager 345. The content request manager 345 then retrieves learned usage characteristics associated with the unique hashed identifier from the learned usage characteristics database 340. The content request manager 345 then compares the retrieved learned usage characteristics to target usage characteristics provided by content providers to select a supplemental content item to return to the content publisher. For example, the content request manager 345 may find the supplemental content item associated with target usage characteristics that most closely match the learned usage characteristics. In some embodiments, the content request manager 345 selects among supplemental content based on the learned usage characteristics, data received from the content publisher 210, a bid system among the content providers 220, or some other factors or combination of factors. The content request manager 345 transmits the selected supplemental content to the content publisher, which provides the supplemental content to the user device. The content request manager 345 may keep a record of each delivery of supplemental content to a user device.

The modeling engine 350 includes various databases and components for training the app identification model 330 and the usage characteristic model 335. The modeling engine 350 trains the app identification model 330 using the app virtualization module 355, app training data 360, and the app identification modeling engine 365. The modeling engine 350 trains the usage characteristic model 335 using usage characteristic training data 370 and the usage characteristic modeling engine. The modeling engine 350 is located within the analytics module 140, rather than at the analytics provider 110 or elsewhere, because network traffic can vary based on the network over which data is carried. For example, the network traffic patterns that characterize a given app on one network operator may be different from network traffic patterns that characterize the same app on a different network operator. The app identification model 330 and usage characteristic model 335 are trained at the analytics module deployed at the network operator, and based on network traffic over that network operator's network, so that the trained app identification model 330 and usage characteristic model 335 account for network-specific patterns.

To develop the app identification model 330, the modeling engine 350 executes a set of apps and stores data describing network traffic associated with each of the apps. For example, the analytics module 140 can virtualize apps using the app virtualization module 355. The app virtualization module 355 runs virtualizations of the client devices on a server of the analytics module 140, and the apps are run on the virtualized client devices. In some embodiments, the app virtualization module 355 also mimics an actual user's behavior in an app, e.g., by selecting and following links within the app. The app virtualization module 355 collects and stores sample network traffic data associated with the app as app training data 360, which include similar data to the data stored in the network flow logs 310 and/or DNS logs 315 described above. The app training data 360 also includes an identification of the app that generated the network traffic. In other embodiments, some or all of the app training data 360 is received from use of apps in non-virtual environments. For example, the analytics module 140 may receive data describing actual use of apps collected from user devices 130 whose users have authorized the analytics module 140 to collect data for app characterization purposes.

The app identification modeling engine 365 applies machine learning techniques to train the app identification model 330 for identifying an app based on network traffic data. The app identification modeling engine 365 extracts feature values for use in the app identification model 330 based on the app training data 360, the features being variables deemed potentially relevant to how one or more patterns in the training data are associated with one or more apps. For example, the features may include packet size, packet frequency, patterns in number of transmissions, patterns in direction of transmissions, destination IP address, source IP address, etc. The app identification modeling engine 365 uses supervised machine learning to train the app identification model 330. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

As discussed above, in one embodiment, the usage characteristic model 335 is or includes a machine learned model. In this embodiment, usage characteristic training data 370 stores data correlating various usage characteristic labels with user device behavior data, such as the type of data stored by the network flow logs 310, DNS logs 315, device location logs, and/or cell logs 320. For example, this data can be collected at the analytics module 140 for user devices 130 of users who have authorized data collection for usage characterization purposes; these users also provide usage characteristics (e.g., interests, age, gender, location, etc.) that are stored in the usage characteristic training data 370. In some embodiments, the usage characteristic training data 370 may be data that summarizes the raw network traffic data rather than the raw network traffic data itself. As one example, DNS logs may be summarized by calculating percentage of browsing time spent at each of the top 100 or top 1000 most popular domains. Network flow logs 310 may be summarized using statistical analysis of packet sizes, packet frequency, number of transmissions, direction of transmissions, destination IP addresses, etc. Cell logs 320 may be summarized using statistical analysis of call lengths, call frequencies, call times, user device locations, etc.

In this embodiment, the usage characteristic modeling engine 375 applies machine learning techniques to generate the machine-learned usage characteristic model for identifying usage characteristics based on network traffic data. The usage characteristic modeling engine 375 extracts feature values for use in the machine-learned usage characteristic model based on the usage characteristic training data 370, the features being variables deemed potentially relevant to how one or more patterns in the training data are associated with one or more usage characteristics. For example, the features may include some or all of the summary data described above. The usage characteristic modeling engine 375 uses supervised machine learning to train the machine-learned model. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

Figure 4:
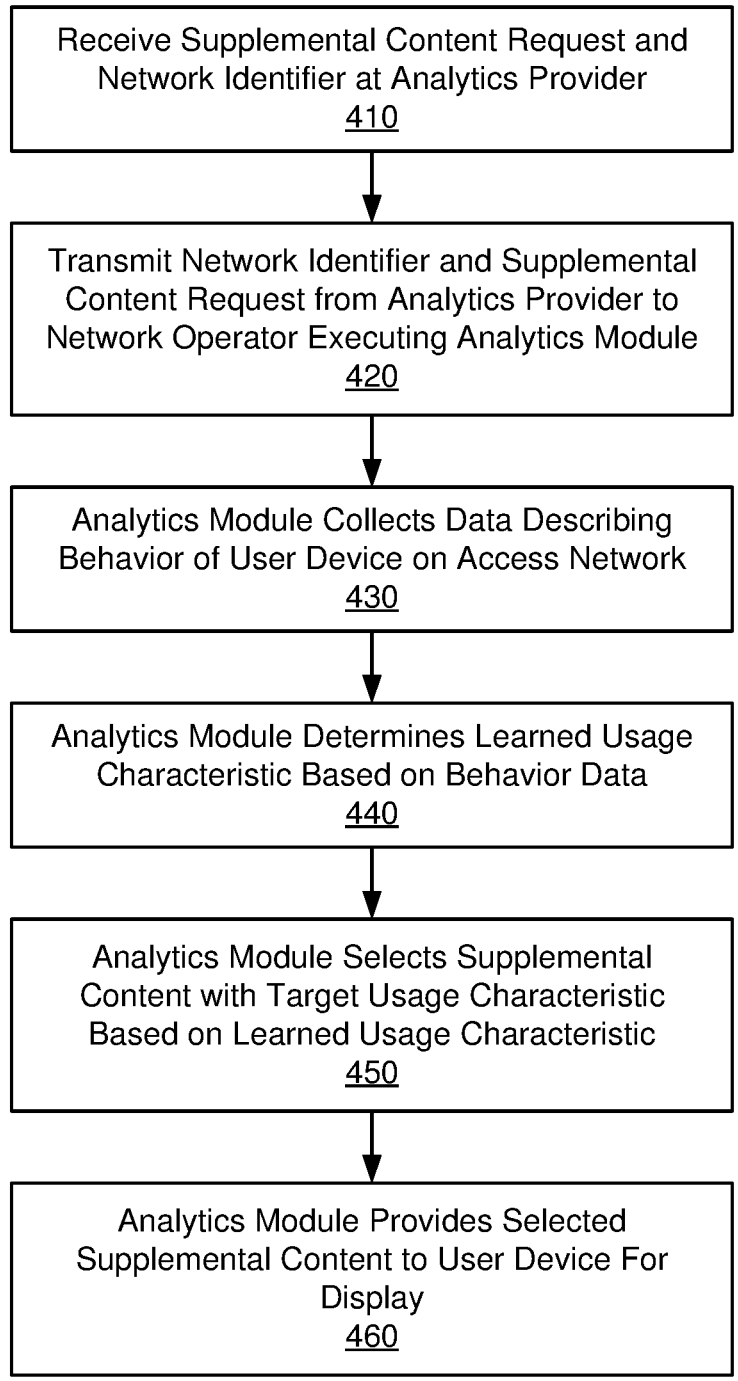
FIG. 4 is a flowchart illustrating a process of determining a usage characteristic and selecting content, according to an embodiment.

FIG. 4 is a flowchart illustrating a process of determining a usage characteristic and selecting content, according to an embodiment. The steps of FIG. 4 may be performed by the analytics provider 110 and the analytics module 140 as described below. Some or all of the steps may be performed by other modules in other embodiments. In addition, other embodiments may include different and/or additional steps and the steps may be performed in different orders.

The analytics provider 110 receives 410 a supplemental content request and a network identifier associated with the supplemental content request. For example, the content publisher 210 transmits a request for supplemental content 240 with an IP address 250 of a recipient user device 130 to the analytics provider 110 in response to a content request 230 received from the user device 130.

The analytics provider 110 transmits 420 the network identifier and the supplemental content request to the network operator 120, which is executing the analytics module 140 provided by the analytics provider 110. For example, the analytics provider 110 transmits a request for content to the network operator 120 managing the access network 160 over which the user device 130 is communicating with the content publisher 210, along with the IP address 250 used to identify the user device 130 on the access network 160.

The analytics module 140 collects data describing behavior of the user device 130 on the access network managed by the network operator 120. For example, the analytics module 140 may retrieve usage logs relating to the user device 130, such as network flow logs, DNS logs, or cellular logs, describing the behavior of the user device 130 on the access network 160. The analytics module 140 may associate behavior data with a unique hashed identifier and identify the data describing the user device 130 based on the unique hashed user identifier of the user device 130, as described with respect to FIG. 3.

The analytics module 140 determines 440 one or more learned usage characteristics of the user device 130 based on the data describing the behavior of the user device on the access network. For example, the analytics module 140 may use the app identification model 330 and/or the usage characteristic model 335 to determine one or more learned usage characteristics of the user device 130, as described with respect to FIG. 3.

The analytics module 140 selects 450 supplemental content having a target usage characteristic based on the learned usage characteristic. For example, the analytics module 140 has received and stored a plurality of supplemental content items from one or more content providers 220, and each received supplemental content item is associated with at least one target usage characteristic provided by the content publisher. The analytics module 140 selects one of the stored supplemental content items by determining a match between the learned usage characteristics and the target usage characteristic of the supplemental content item.

The analytics module 140 provides 460 the selected supplemental content to the user device 130 for display. For example, the analytics module 140 provides the selected supplemental content item to the content publisher 210, and the content publisher 210 combines the supplemental content item with primary content and publishes the combined content to the user device.

Figure 5:
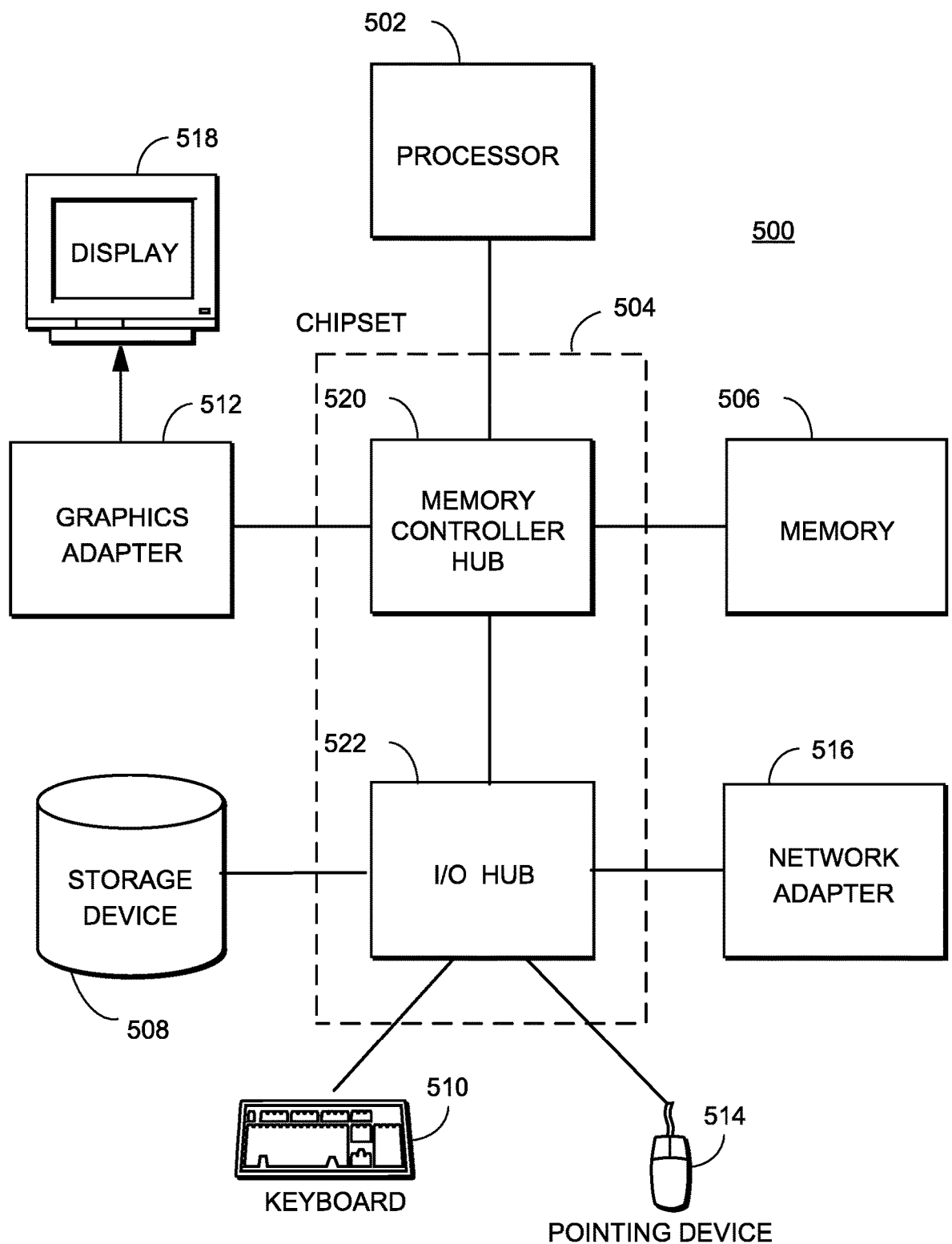
FIG. 5 is a high-level block diagram illustrating an example computer for implementing the analytics provider, network operator, user device, content publisher, or content provider of FIG. 2.

FIG. 5 is a high-level block diagram illustrating an example computer 500 for implementing the analytics provider, network operator, client device, content provider, content publisher, and/or the analytics module of FIG. 1. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard, or some combination thereof, and is used to input data into the computer 500. In some embodiments, the computer 500 may be configured to receive input (e.g., commands) from the input interface 514 via gestures from the user. The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 506, and executed by the processor 502.

The types of computers 500 used by the entities of FIG. 1 can vary depending upon the embodiment and the processing power required by the entity. The computers 500 can lack some of the components described above, such as graphics adapters 512, and displays 518. For example, the analytics provider 110 and analytics module 140 can each be formed of multiple blade servers communicating through a network such as in a server farm.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for characterizing device usage and selecting supplemental content based on usage characteristics. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method for providing supplemental content to a user device comprising:
   receiving, at an analytics provider, a request for supplemental content to be displayed to a user by the user device, the request comprising a network identifier identifying the user device on an access network over which the user device receives content;
   receiving, from a plurality of content providers, a plurality of supplemental content items, each supplemental content item associated with a respective target usage characteristic; and
   transmitting the plurality of supplemental content items and associated target usage characteristics to a plurality of analytics modules, each of the plurality of analytics modules provided by the analytics provider to a respective one of a plurality of network operators,
   wherein each of the plurality of analytics modules is adapted to store the plurality of supplemental content items and select from among the stored supplemental content items based on the target usage characteristics and the at least one learned usage characteristic;
   transmitting the request for supplemental content and the network identifier of the user device to an analytics module of the plurality of analytics modules and executing at a network operator of the plurality of network operators, the network operator managing the access network, wherein the analytics module is configured by the analytics provider to:
      collect data describing behavior of the user device on the access network managed by the network operator, the data associated with the network identifier of the user device,
      determine at least one learned usage characteristic of the user device based on the data describing the behavior of the user device on the access network,
      select a supplemental content item from a plurality of supplemental content items based on a target usage characteristic associated with the selected supplemental content item and the at least one learned usage characteristic of the user device, and
      provide the selected supplemental content item for display on the user device.

2. The method of claim 1, wherein the analytics module is configured to determine the at least one learned usage characteristic based on the data describing behavior of the user device by:
   receiving network traffic data generated by interactions of the user device with the access network, wherein the network traffic data describes the behavior of the user device on the access network;
   identifying, using an app identification model trained to identify an app from network traffic data, at least one app running on the user device based on the network traffic data; and
   determining, using a usage characteristic model trained to determine usage characteristics based on app use, the at least one learned usage characteristic based at least in part on the identified at least one app.

3. The method of claim 1, wherein the analytics module determines the at least one usage characteristic based on the data describing behavior of the user device by:
   storing a usage log describing the behavior of the user device on the access network;
   analyzing the usage log using a usage characteristics model trained to determine usage characteristics based on a usage log; and
   determining the at least one usage characteristic responsive to the analysis.

4. A method for providing supplemental content to a user device comprising:
   receiving, at an analytics provider, a request for supplemental content to be displayed to a user by the user device, the request comprising a network identifier identifying the user device on an access network over which the user device receives content, wherein the network identifier of the user device and data identifying a content publisher is received from the content publisher;
   identifying, by the analytics provider, responsive to the network identifier, a network operator that manages the access network over which the user device receives content from the content publisher;
   communicating the data identifying of the content publisher to the identified network operator with the request for supplemental content to an analytics module provided by the analytics provider and executing at a network operator, the network operator managing the access network, wherein the analytics module of the identified network operator is configured by the analytics provider to:
      collect data describing behavior of the user device on the access network managed by the network operator, the data associated with the network identifier of the user device,
      determine at least one learned usage characteristic of the user device based on the data describing the behavior of the user device on the access network,
      select a supplemental content item from a plurality of supplemental content items based on a target usage characteristic associated with the selected supplemental content item and the at least one learned usage characteristic of the user device, and
      provide the selected supplemental content item to the content publisher, wherein the content publisher publishes the selected supplemental content item to the user device.

5. A method for providing supplemental content comprising:
   collecting, at an analytics module executing at a network operator managing an access network, data describing behavior of a user device on the access network managed by the network operator,
   determining at least one learned usage characteristic associated with the user device based on the data describing the behavior of the user device on the access network by:
      receiving network traffic data generated by interactions of the user device with the access network, wherein the network traffic data describes the behavior of the user device on the access network;
      identifying, using an app identification model trained to identify an app from network traffic data, at least one app running on the user device based on the network traffic data, wherein the app identification model is trained by:
         executing at least one app at the analytics module to generate sample network traffic data for the at least one app on the access network;
         storing the sample network traffic data associated with the at least one executed app; and training, using machine learning, the app identification model to identify the at least one app based on the stored sample network traffic data; and determining, using a usage characteristic model trained to determine usage characteristics based on app use, the at least one learned usage characteristic based at least in part on the identified at least one app;

storing a plurality of supplemental content items, each supplemental content item associated with at least one target usage characteristic;

receiving a request for supplemental content to be displayed by the user device, the request comprising a current network identifier of the user device, the current network identifier identifying the user device on the access network;

retrieving, based on the current network identifier of the user device, the learned usage characteristic associated with the user device;

selecting a supplemental content item from the plurality of supplemental content items based on a target usage characteristic associated with the selected supplemental content item and the retrieved learned usage characteristic associated with the user device; and providing the selected supplemental content item for display on the user device.

6. The method of claim 5, wherein the analytics module determines the at least one usage characteristic based on the data describing behavior of the user device by:

storing a usage log describing the behavior of the user device on the access network;

analyzing the usage log using a usage characteristics model trained to determine usage characteristics based on a usage log; and determining the at least one usage characteristic responsive to the analysis.

7. The method of claim 6, further comprising:

storing a set of usage characteristic training data comprising a set of usage characteristics associated with a plurality of user devices and a corresponding set of usage logs associated with the plurality of user devices; and training, using machine learning, the usage characteristic model to determine at least one learned usage characteristic based on a usage log.

8. A non-transitory computer-readable medium comprising instructions encoded thereon for providing supplemental content to a user device, the instructions causing one or more processors to perform operations when executed, the instructions comprising instructions to:

receive, at an analytics provider, a request for supplemental content to be displayed to a user by the user device, the request comprising a network identifier identifying the user device on an access network over which the user device receives content;

receive, from a plurality of content providers, a plurality of supplemental content items, each supplemental content item associated with a respective target usage characteristic; and transmit the plurality of supplemental content items and associated target usage characteristics to a plurality of analytics modules, each of the plurality of analytics modules provided by the analytics provider to a respective one of a plurality of network operators, wherein each of the plurality of analytics modules is adapted to store the plurality of supplemental content items and select from among the stored supplemental content items based on the target usage characteristics and the at least one learned usage characteristic;

transmit the request for supplemental content and the network identifier of the user device to an analytics module of the plurality of analytics modules and executing at a network operator of the plurality of network operators, the network operator managing the access network, wherein the analytics module is configured by the analytics provider to:

collect data describing behavior of the user device on the access network managed by the network operator, the data associated with the network identifier of the user device, determine at least one learned usage characteristic of the user device based on the data describing the behavior of the user device on the access network, select a supplemental content item from a plurality of supplemental content items based on a target usage characteristic associated with the selected supplemental content item and the at least one learned usage characteristic of the user device, and provide the selected supplemental content item for display on the user device.

9. The non-transitory computer-readable medium of claim 8, wherein the analytics module is configured to determine the at least one learned usage characteristic based on the data describing behavior of the user device by:

receiving network traffic data generated by interactions of the user device with the access network, wherein the network traffic data describes the behavior of the user device on the access network;

identifying, using an app identification model trained to identify an app from network traffic data, at least one app running on the user device based on the network traffic data; and determining, using a usage characteristic model trained to determine usage characteristics based on app use, the at least one learned usage characteristic based at least in part on the identified at least one app.

10. The non-transitory computer-readable medium of claim 8, wherein the analytics module determines the at least one usage characteristic based on the data describing behavior of the user device by:

storing a usage log describing the behavior of the user device on the access network;

analyzing the usage log using a usage characteristics model trained to determine usage characteristics based on a usage log; and determining the at least one usage characteristic responsive to the analysis.

11. A non-transitory computer-readable medium comprising instructions encoded thereon for providing supplemental content to a user device, the instructions causing one or more processors to perform operations when executed, the instructions comprising instructions to:

receive, at an analytics provider, a request for supplemental content to be displayed to a user by the user device, the request comprising a network identifier identifying the user device on an access network over which the user device receives content, wherein the network identifier of the user device and data identifying a content publisher is received from the content publisher;

identify, by the analytics provider, responsive to the network identifier, a network operator that manages the access network over which the user device receives content from the content publisher;

communicate the data identifying of the content publisher to the identified network operator with the request for supplemental content to an analytics module provided by the analytics provider and executing at a network operator, the network operator managing the access network, wherein the analytics module of the identified network operator is configured by the analytics provider to:
  collect data describing behavior of the user device on the access network managed by the network operator, the data associated with the network identifier of the user device,
  determine at least one learned usage characteristic of the user device based on the data describing the behavior of the user device on the access network,
  select a supplemental content item from a plurality of supplemental content items based on a target usage characteristic associated with the selected supplemental content item and the at least one learned usage characteristic of the user device, and
  provide the selected supplemental content item to the content publisher, wherein the content publisher publishes the selected supplemental content item to the user device.

12. A non-transitory computer-readable medium comprising instructions encoded thereon for providing supplemental content, the instructions causing one or more processors to perform operations when executed, the instructions comprising instructions to:
  collect, at an analytics module executing at a network operator managing an access network, data describing behavior of a user device on the access network managed by the network operator,
  determine at least one learned usage characteristic associated with the user device based on the data describing the behavior of the user device on the access network by:
    receiving network traffic data generated by interactions of the user device with the access network, wherein the network traffic data describes the behavior of the user device on the access network;
    identifying, using an app identification model trained to identify an app from network traffic data, at least one app running on the user device based on the network traffic data, wherein the app identification model is trained by:
      executing at least one app at the analytics module to generate sample network traffic data for the at least one app on the access network;
      storing the sample network traffic data associated with the at least one executed app; and
      training, using machine learning, the app identification model to identify the at least one app based on the stored sample network traffic data; and
    determining, using a usage characteristic model trained to determine usage characteristics based on app use, the at least one learned usage characteristic based at least in part on the identified at least one app;
  store a plurality of supplemental content items, each supplemental content item associated with at least one target usage characteristic;
  receive a request for supplemental content to be displayed by the user device, the request comprising a current network identifier of the user device, the current network identifier identifying the user device on the access network;
  retrieve, based on the current network identifier of the user device, the learned usage characteristic associated with the user device;
  select a supplemental content item from the plurality of supplemental content items based on a target usage characteristic associated with the selected supplemental content item and the retrieved learned usage characteristic associated with the user device; and
  provide the selected supplemental content item for display on the user device.

13. The non-transitory computer-readable medium of claim 12, wherein the analytics module determines the at least one usage characteristic based on the data describing behavior of the user device by:
  storing a usage log describing the behavior of the user device on the access network;
  analyzing the usage log using a usage characteristics model trained to determine usage characteristics based on a usage log; and
  determining the at least one usage characteristic responsive to the analysis.

14. The non-transitory computer-readable medium of claim 13, wherein the instructions further comprise instructions to:
  store a set of usage characteristic training data comprising a set of usage characteristics associated with a plurality of user devices and a corresponding set of usage logs associated with the plurality of user devices; and
  train, using machine learning, the usage characteristic model to determine at least one learned usage characteristic based on a usage log.

* * * * *